United States Patent [19]

Weng et al.

[11] Patent Number: 5,619,655
[45] Date of Patent: Apr. 8, 1997

[54] SYSTEM FOR ADMINISTRATION AND MANAGEMENT OF NETWORK FROM REMOTE OR CENTRAL STATION THROUGH AN OPERATOR INTERFACE WHICH PREPARES AND STORES THE MANAGEMENT ORDERS FOR EXECUTION

[75] Inventors: Wolfgang Weng, Munich; Friedrich Woerndle, Ostermuenchen, both of Germany

[73] Assignee: Siemens Aktiengesellschaft, Munich, Germany

[21] Appl. No.: 185,242

[22] Filed: Jan. 24, 1994

[30] Foreign Application Priority Data

Feb. 26, 1993 [DE] Germany .................... 43 06 031.5

[51] Int. Cl.$^6$ .................................................... G06F 13/00
[52] U.S. Cl. .................... 395/200.11; 364/130; 364/138; 364/191; 364/192; 364/242.94; 364/269.4; 364/281.3; 395/200.06; 395/200.09; 395/200.1; 395/200.13; 395/670; 395/392
[58] Field of Search .................... 395/650, 700, 395/800, 200.09, 200.06, 200.1, 200.11, 200.13, 375, 600; 364/191, 192, 130, 242.94, 269.4, 281.3

[56] References Cited

U.S. PATENT DOCUMENTS

| | | | |
|---|---|---|---|
| 4,866,663 | 9/1989 | Griffin | 364/900 |
| 5,018,097 | 5/1991 | Kuhlmann et al. | 364/900 |
| 5,047,923 | 9/1991 | Elstner et al. | 364/200 |
| 5,323,393 | 7/1994 | Barrett et al. | 370/85.8 |
| 5,339,432 | 8/1994 | Crick | 395/700 |
| 5,390,335 | 2/1995 | Stephan et al. | 395/800 |
| 5,432,931 | 7/1995 | Woess et al. | 395/650 |
| 5,491,796 | 2/1996 | Wanderer et al. | 395/200.09 |

FOREIGN PATENT DOCUMENTS 58-107957  6/1983  Japan .................... G06F 9/00

*Primary Examiner*—Thomas C. Lee
*Assistant Examiner*—Ki S. Kim
*Attorney, Agent, or Firm*—Hill, Steadman & Simpson

[57] ABSTRACT

In a network management central (NMZ), which is connected to communication systems (KS) for remote control administration via a communication network (KM), prepared administration program modules (APM') are selected under the control of the user interface with the assistance of an interrogation routine (AFR). Operator-prescribable administration and maintenance parameters (p) as well as job-associated information (ksi, afi, ati) for the communication systems (KS) to be administered are interrogated under the control of the user interface and are entered into the prepared administration program module (APM') for the purpose of forming an administration order program module (APM). With the assistance of a job management routine (AVR), the administration order program modules (APM) formed in this fashion are communicated via the communication network (KN) to the communication systems (KS) to be administered and are processed in this communication system.

10 Claims, 3 Drawing Sheets

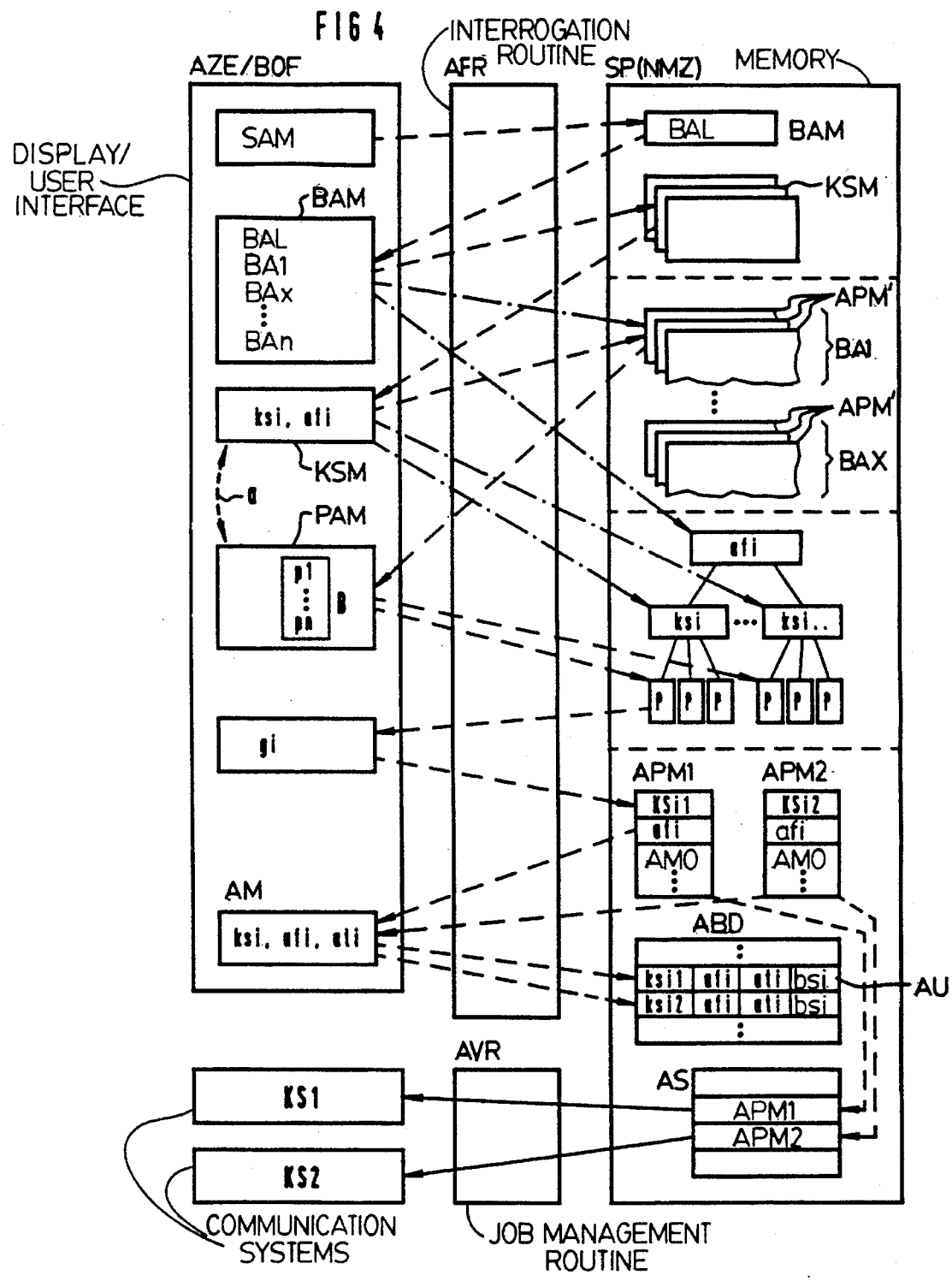

SYSTEM FOR ADMINISTRATION AND MANAGEMENT OF NETWORK FROM REMOTE OR CENTRAL STATION THROUGH AN OPERATOR INTERFACE WHICH PREPARES AND STORES THE MANAGEMENT ORDERS FOR EXECUTION

BACKGROUND OF THE INVENTION

The administration, and in particular the management of line units of communication systems is effected, as known, on the basis of administration and maintenance instructions or commands. Administration and maintenance parameters are inserted into these administration and management instructions that respectively produce references to the line units or terminals of the communication system or of subscriber telephone numbers to be administered. By inputting a plurality of such administration and maintenance instructions, for example via an operating control of a communication system, subscriber lines or subscriber telephone numbers can be modified, erased or newly established. The administration and maintenance instructions are processed in the respective communication system in real-time mode, that is, immediately after being input. This means that parallel processing of one or more administration and maintenance instructions is not possible in a plurality of communication systems. Due to this real-time processing of administration and maintenance instructions, a remote control administration of a plurality of a communication systems is extremely complicated.

SUMMARY OF THE INVENTION

It is an object of the present invention to provide a simplified remote control administration of communication systems via a communication network.

In general terms the present invention is a method for forming administration order program modules in a network management central to which an operating control is connected and which is connectable to communication systems for the purpose of remote control administration via a communication network. An operator task list, including allocated, prepared administration program modules and representing different operator tasks is stored in the network management central. An operator task is selected under the control of the user interface from the operator task list visualized at the operating control and with the assistance of an interrogation routine implemented in the operating control. Operator-prescribable administration and maintenance parameters as well as job-associated information for the communication systems to be administered are interrogated under the control of the user interface and are entered into the prepared administration program module for the purpose of forming an administration order program module.

An important aspect of the method of the present invention is that an operator task list including prepared administration program modules which represents different operator tasks (for example, establishing subscribers, modifying, etc.) is stored in a network management central or operating control. An operator task (for example, modify subscriber) is selected under operator control from this visualized operator task list with the assistance of an interrogation routine. Operator-prescribable, administration and maintenance parameters as well as task-specific information for the communication system to be administered are subsequently interrogated under operator control and are entered into the prepared administration program module for forming an administration order program module. Consequently, administration order program modules are formed using the method of the present invention that can be communicated to the respective communication systems and are supplied therein to the administration programs for real-time processing.

The operator task, the task-associated information about the communication systems to be administered as well as the administration and maintenance parameters to be inserted into the administration order program modules are particularly advantageously respectively selected by user interface inputs with the assistance of the interrogation routine and of interrogation masks controlled at a display means of the operating control. The interrogation masks are fashioned in view of operator prompting such that there is a minimum of operator interface controlled inputs. The outlay for inputting the administration and maintenance parameters is reduced to a minimum with the assistance of these interrogation masks. Input errors are avoided in addition to a saving of input time.

According to an advantageous development of the method of the present invention, communication system information defining the communication system to be administered, job information defining the respective operator task, as well as type of job information defining the type of the administration order are interrogated as job-associated information with the assistance of the interrogation routine when forming administration order program modules. They are stored in a job library file and the allocated administration order program module is stored in a job file memory of the network management central. The allocated administration order program module is indicated by the job library file entry of a job management routine. With the assistance of the job management routine, the respective administration order program module is communicated to the communication system identified by the communication system information. The administration and maintenance instructions of the administration order program modules are supplied therein to administration program modules that process and interpret the administration and maintenance instructions. After the processing of the administration order program modules, the processing results are communicated via the communication network to the network management central and are stored thereat. The administration order program module is advantageously communicated to the communication system to be administered with the assistance of the information deposited in the job library file and is processed thereat, that is, the appropriate changes of the communication line units or subscriber telephone numbers are implemented.

Status information that indicates the processing status of the administration order program modules is entered into the job library file in the network management central with the assistance of the job management routine. A processing status in view of the processing by the job management routine is thereby determined, for example the administration order program module is stored in the job file memory and is waiting for the scheduled communication to a communication system.

With the assistance of the type of job information, the transmission time of the respective administration order program module, the visualization of the information entered in the job library file, the erasing of a job, an editing of the administration order program module can be defined or effected at the user interface. Also, job status information for visualization of the current processing status can be defined or effected. Consequently, the processing or the cancellation of the job as well as a visualization of the stored information for the purpose of editing or evaluation is essentially effected with the type of job information.

The modification of the lob processing or the interrogation of the entered status information is effected by an updating message into which type of job information, job information and communication system information is entered. Given a modification of the job processing (for example, from implementing the job at the next possible point in time to canceling the job), the type of job information contained in the updating message is thereby entered instead of the stored type of job information, that is, the existing type of job information is overwritten.

According to another advantageous development of the method of the present invention, the jobs or functions to be implemented in the interrogation routine are realized by a keyboard program module, by a text program module, by a help program module, by an editing program module, by a data management program module, by a generator program module and by a job program module. Access to the individual program modules is realized by a software bus in program-oriented fashion. An important advantage of this program module structure is that individual modules can be added or removed with relatively little outlay.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 4 depicts the production of administration order program modules and their transmission to and processing in communication systems, with reference to a flowchart.

DESCRIPTION OF THE PREFERRED EMBODIMENT

Figure 1:
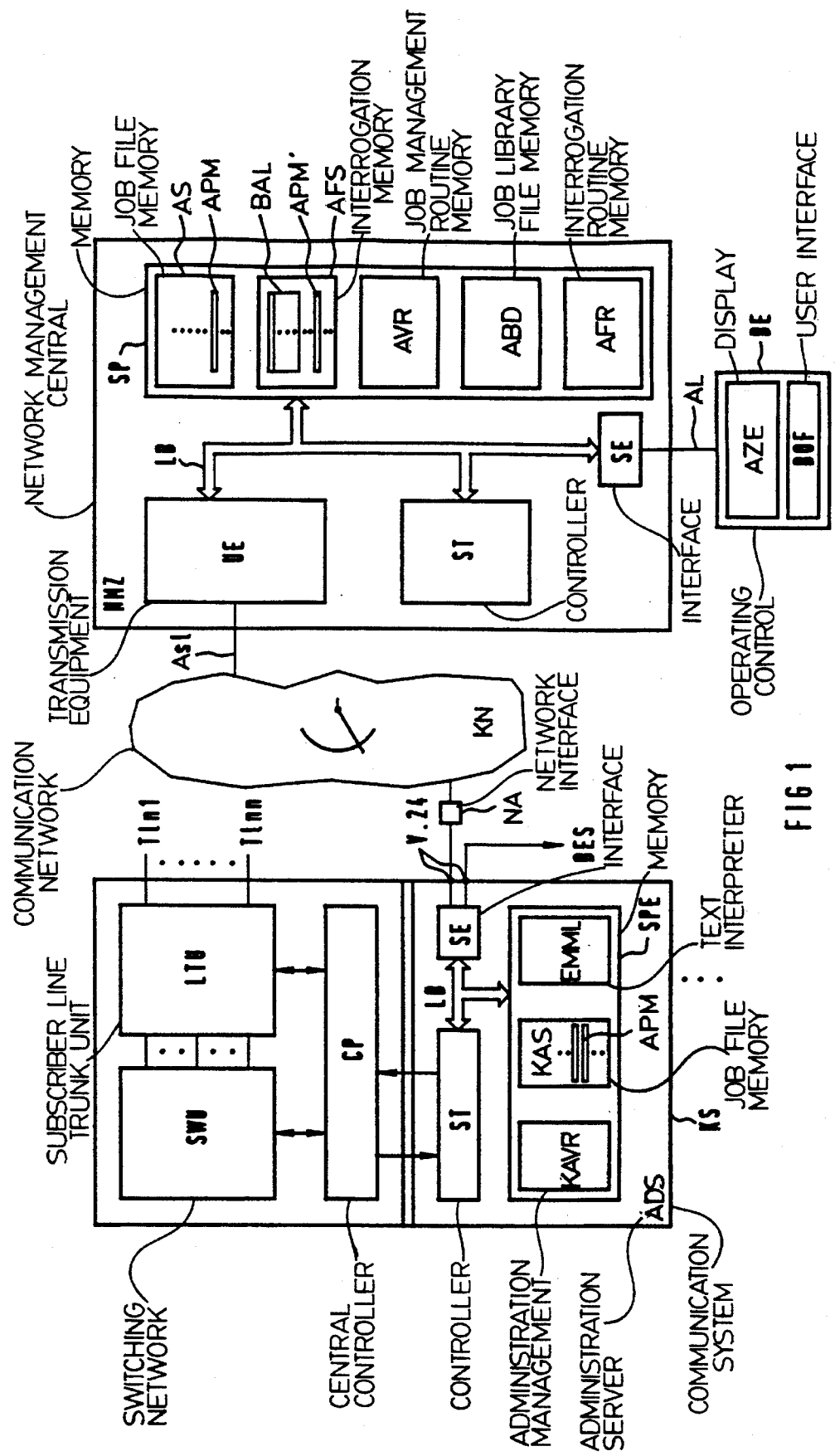
FIG. 1 depicts the structure of a network management central and of one of the communication system to be administered.

FIG. 1 shows a network management central NMZ having a controller ST realized, for example, by a microprocessor system, transmission equipment UE, a memory SP and an interface equipment SE. These components are connected to one another by a local bus LB having address, data and control lines (not shown). The transmission equipment UE, as known, is fashioned such that, for example, switched connections can be set up via a communication network KN (for example, the public telephone network) to communication systems KS. To this end, the transmission equipment UE is connected to the public telephone network KN via a central office line ASL.

An operating control BE is connected to the interface equipment SE via a central office line AL. This operating control BE is realized, for example, by a video means. The operating control BE comprises a user interface BOF usually realized as a keyboard, and a display means AZE usually a picture screen.

The memory SP in the network management central NMZ has a job file memory AS that stores administration order program modules APM, an interrogation memory AFS that stores an operator task list BAL and allocated, prepared administration order program modules APM', an area that stores a job management routine AVR, an area that stores a job library file ABD and an area that stores an interrogation routine AFR that is realized in program-oriented terms.

For the purpose of the remote control administration, the network management central NMZ can be connected via the communication network KN to communication systems KS, particularly telephone private branch exchanges. For example, FIG. 1 shows the structure of one of the communication systems KS. The switching-oriented part of the communication system KS is thereby formed by a switching network SWU, by a subscriber line trunk unit LTU and by a central controller CP. Subscribers TLN1 . . . . TLNn or, respectively, connections to public networks (for example, the public telephone network) can be connected to the subscriber line trunk unit LTU. An operational administration server ADS is connected to the switching-oriented part for operating or administering the communication system KS. The controller ST thereof is connected to the central controller CP of the switching-oriented part for the purpose of information exchange. The controller ST that, for example, is likewise realized in microprocessor technology is connected to interface equipment SE and to a memory means SPE via a local bus LB having address, data and control lines. This interface equipment SE is connected to the communication network KN via a network interface means NA (realized, for example, on the basis of known modem technology). For example, the known V.24 interface is provided as an interface between the interface equipment SE and the network interface means NA. An operating control BES can be connected to this interface equipment SE via a further V.24 interface for maintaining or operating the communication system KS. An administration management routine KAVR, a job file memory KAS that stores the administration order program modules APM, as well as a text interpreter module EMML that interprets the administration order program module APM are arranged in the memory means SPE for the administration of the communication system KS. Together with the controller ST and with the central controller CT, the administration in accord with the administration and maintenance instructions AMO contained in the communicated administration order program modules APM is implemented with the assistance of these three components that are realized in program-oriented terms.

Figure 2:
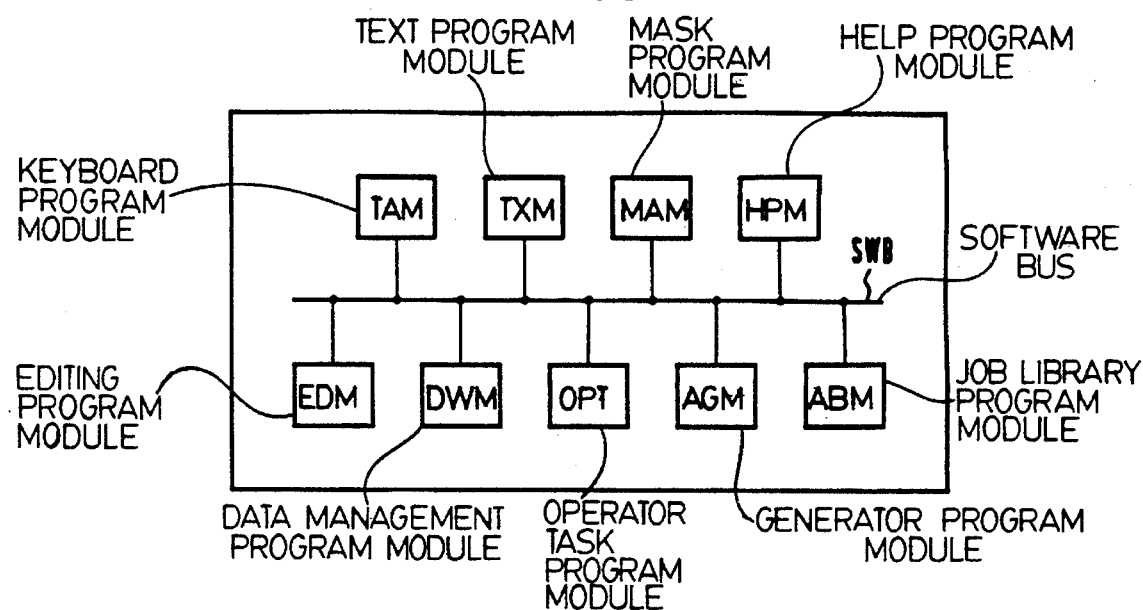
FIG. 2 depicts the program-oriented structuring of the interrogation routine implemented in the operating control.

FIG. 2 shows the program-oriented structuring of the interrogation routine AFR implemented in the network management central NMZ. The following programs modules are provided in this interrogation routine AFR: a keyboard program module TAM by means of which the operating elements, that is, keys, that are actuated at the user interface, that is, at a keyboard, are identified and are forwarded to the display means AZE;

a text program module TXM by means of which stored prescribed texts (including different languages) are forwarded to the display means AZE;

a mask program module MAM by means of which stored masks BAM, KSM, PAM, AM are forwarded to the display means AZE;

a help program module HPM by means of which stored help information that inform and prompt a user is forwarded to the display means AZE;

an editing program module EDM by means of which administration order program modules APM that have already been prepared can be edited;

a data management program module DWM by means of which input communication system information, job information and type of job information ksi, afi, ati as well as the interrogated, administration and maintenance parameters p are entered and managed operator-task-structured;

an operator task program module OPT wherein a list of currently available operator tasks, that is, prescribed administration program module APM' that represents an operator task, is administered;

a generator program module AGM that generates administration order program modules APM; and a job library module ABM by means of which the communication system information, job information and type of job information ksi, afi, ati as well as processing status information bsi are entered into or read from the job library file ABD.

The individual program modules are connected to one another and can be selected via a software bus SWB that is realized in program-oriented terms.

Figure 3:
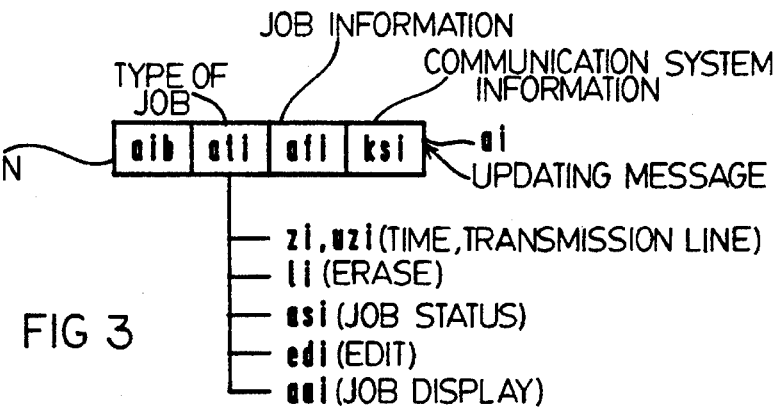
FIG. 3 depicts the structuring of an updating message.

FIG. 3 shows an updating message ai via which an entry already existing in the job library file ABD can be modified or processing status information bsi stored therein can be retrieved. The updating message ai is defined by an information aib. This is followed by a type of job information ati with which the type of job processing is defined. Six type of job information ati are recited for the exemplary embodiment in FIG. 2, whereby respectively only one of these type of job information ati can be inserted into an updating message ai. When the type of job information ati is represented by a time information zi or by a transmission time information uzi, then the administration order program module APM is transmitted to the appertaining communication system KS at the next possible point in time or at the point in time defined by the transmission time information uzi. When the type of job information ati represents an erase information li, then the job, that is, not the administration order program module APM is erased. Further, the type of job information ati can be represented by a job status information asi,, whereby the respective processing status of the respective administration order program module APM can be retrieved by this job status information. This means that the existing processing status information bsi about the processing status of the respective administration order program module APM is communicated to the display means AZE of the operating control BE. The type of job information ati can also be presented by an editing information edi, whereby an editing of the respective administration order program module APM is possible. Arbitrarily new, completely different administration order program modules APM can be formed with the assistance of this editing mode by editing existing administration order program modules. Further, the type of job information ati can be represented by a job display information aai, as a result whereof a display of the information allocated to a job is effected at the display means AZE.

The updating message ai further comprises a job information afi and a communication system information ksi. The job information afi indicates the job, that is, the respective operator task (for example, establish subscribers) allocated to the administration order program module APM. The communication system information ksi identifies the communication system KS to which the administration order program module APM that is formed is to be communicated in order, for example, to establish subscribers thereat, that is, to administer them.

With reference to a flowchart, FIG. 4 shows the formation of administration order program modules APM as well as their communication to the appertaining communication systems KS. The picture screen contents or input information of the display means or user interface AZE/BOF are shown in the left-hand column of FIG. 4 and the memory contents of the memory means SP of the network management central NMZ are shown in the right-hand column. Those program modules by means of which the information flow is effected are contained in the middle column. The formation of one or more administration order program modules APM is initiated on the basis of a start message SAM input at the user interface BOF. The information flow between the display means or user interface AZE/BOF to the memory means SP with the assistance of the program modules is shown by broken lines, dot-dash lines or double dot-dash lines. As a result of the input start message SAM, an operator task mask BAM stored in the memory means SP is forwarded to the display means AZE with the assistance of the interrogation routine AFR, a list BAL of operator tasks BA1 . . . BAn being indicated therein. A desired operator task (for example, establishing digital subscribers) is selected from this list BAL of operator tasks BA1 . . . BAn by means of which the user interface BOF, for example, a cursor control. In the exemplary embodiment, this operator task is identified as BAx. A prepared administration program module APM' is stored in the memory means SP for every operator task BE1 . . . BEn. After the selection of the operator task BAx, a communication system matrix KSM is forwarded to the display means AZE of the operating control BE from the memory SP with the assistance of the interrogation routine AFR. Communication system information ksi and job information afi are entered into this communication system matrix KSM. The communication system KS that is to be administered with the assistance of the subsequently formed administration order program module APM is identified by the communication system information ksi. The operator task BAx is again recited by the job information afi. After input of these two information, the parameter interrogation masks PAM inserted into the prepared administration program modules APM' are forwarded to the display means AZE, again with the assistance of the interrogation routine AFR. Under the control of the user interface, the administration and maintenance parameters p1 . . . pn are entered into these in the area B provided for this purpose. With the assistance of the interrogation routine AFR, these parameters p1 . . . pn are communicated to the memory SP and are respectively allocated thereat to the appertaining communication system information ksi that is already stored. Analogous to the input procedures set forth above, further communication system information ksi with the same job information afi and the appertaining parameters p1 . . . pn can be entered into the corresponding parameter interrogation masks PAM in further communication system masks KSM and the administration and maintenance parameters p allocated to the respective communication system information ksi . . . can be stored under the same operator task BA with the assistance of the interrogation routine AFR. The storing of this operator task BAx identified by the job information afi and of the allocated communication system information ksi or administration and maintenance parameters p ensues in a tree structure. That is, the communication systems appertaining to the operator task are respectively allocated to an operator task by the communication system information ksi and the relevant administration and maintenance parameter p are respectively allocated to the communication systems. Particularly when establishing digital subscribers, the administration and maintenance parameters p represent the affected central office lines of the communication systems KS and the subscriber telephone numbers provided for these. Over and above this, the administration and maintenance parameters p are also represented by information that identify the subscriber line module area.

After an end of the input of the administration and maintenance parameters p1 . . . . pn, the formation of administration order program modules APM is initiated by an input of a formation information gi under the control of the user interface. The administration and maintenance parameters p are thereby inserted into the administration and maintenance instructions AMO contained in the prepared administration program modules APM'. A separate administration order program module APM is formed for each communication system KS1, KS2 to be administered, whereby the respective operator task BA is defined by the inserted job information afi. By entering the respective communication system information ksi, the respective job information afi and a type of job information ati into a job mask AM, an entry of this information into a job library file ABD can be effected after the formation of the administration order program modules APM, whereby one job AU is stored for every administration order program module APM. With the entry into the job library file ABD, the allocated administration order program module APM is transferred into a job file memory AS and is available there for communication to the communication system KS1, KS2 identified by the communication system information ksi1, ksi2.

Both the job for communication to the respective administration order program module APM as well as the point in time of transmission can be identified with the type of job information ati. In accord with this indicated time of transmission, the allocated administration order program module APM is communicated to the respective communication system KS1, KS2 with the assistance of the job management routine AVR of the network management central NMZ. In the exemplary embodiment, the administration order program module APM1 or, respectively, APM2 is communicated to the first or, respectively, to the second communication system KS1, KS2 and, as already set forth in the description of FIG. 1, is processed thereat. That is, the respective communication system KS1, KS2 is administered according to the indicated administration and maintenance instructions AMO.

By communicating a plurality of administration order program modules APM to a plurality of communication systems KS, an approximately simultaneous remote control administration of communication systems KS can thus be effected, whereby the administration in each of the communication systems KS is implemented in real time by the corresponding administration programs.

Processing status information bsi entered in the job library file ABD can be retrieved with the assistance of a status information sai inserted into an updating message ai. The following operating statuses can be retrieved:

an entry status efs that indicates that the administration order program module APM was entered but no order for processing exists;

a waiting status that indicates the waiting state of the respective administration order program module APM up to the next possible start of processing or up to a scheduled start of processing;

a transmission status that indicates that the respective administration order program module APM was transmitted to the communication system KS identified by the communication system information ksi;

an execution status that indicates the end of processing of the respective administration order program module APM;

an error status fes with which an error during the processing of the administration order program module APM is indicated;

a result status ers that indicates the result of the processing of the administration order program module APM;

an erase status that indicates that the job for the allocated administration order program module APM was erased; and a present status that indicates the presence of an administration order program module APM in the job file memory AS.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for forming administration order program modules in a network management central that is connected to an operating control and which is connectable to communication systems for a remote control administration via a communication network, comprising the steps of:

storing an operator task list, including allocated prepared administration program modules and representing different operator tasks, in the network management central;

selecting an operator task under control of a user interface, said operator task being selected from the operator task list visualized at the operating control using an interrogation routine implemented in the operating control, and interrogating operator-prescribable administration and maintenance parameters and job-associated information for the communication systems to be administered under control of the user interface and entering said parameters and said job-associated information into a respective prepared administration program module for forming an administration order program module;

said job-associated information consisting of at least communication system information identifying the communication system to be administered, job information defining the respective operator task, and type of job information determining the type of the administration order, and being stored in a job library file;

storing the allocated administration order program module, in a job file memory of the network management central;

due to the job library file entry of a job management routine, informing the allocated administration order program module that the administration order program modules are transmitted using the job management routine to the communication systems identified by the communication system information, that the administration and maintenance instructions of the administration order program modules are supplied to the administration program modules in the appertaining communication systems that interpret and process the administration and maintenance instructions; and communicating results of the processing via the communication network to the network management central and storing the communicating results in the network management central.

2. The method according to claim 1, wherein the operator tasks, the job-associated information about the communication systems to be administered, and the administration and maintenance parameters to be inserted into the administration order program modules are each respectively selected by user interface controlled inputs using the interrogation routine and using interrogation masks controlled at the user interface of the operating control, the operating masks being fashioned in view of operator prompting such that a minimal user interface controlled input is effected.

3. The method according to claim 1, wherein status information that indicates processing status of the administration order program module is entered in a job library file in the network management central using the job management routine.

4. The method according to claim 1, wherein the type of job information is one of:

time information defining a next possible point in time of transmission of a respective administration order program module;

transmission time information defining a point in time of transmission of a respective administration order program module;

job display information visualizing current job information of a selected or of a plurality of administration order program modules at a display means of the operating control;

erase information that erases a job;

editing information that enables an editing of an administration order program module at the user interface; or job status information that visualizes a current processing status of an administration order program module at the user interface.

5. The method according to claim 1, wherein type of job processing is modified by the type of job information, the job information and the communication system information recited in an updating message by entry of the current type of job information into the job library file or the entered status information of a job defined by the communication system information and job information is interrogated and visualized.

6. The method according to claim 1, wherein the following are effected in the interrogation routine:

the user interface is controlled by a keyboard program module;

prescribed stored texts are forwarded to a display means at the user interface by a text program module;

help information that informs and prompts the user is forwarded to the display means by a help program module;

administration order program module can be edited by an editing program module;

the job-associated information is managed by a data management program module;

a list of available operative tasks is managed by an operated task program module;

generation of administration order program modules is effected by a generation program module; and entry and reading of the job-associated information in the job library file is effected by a job library program module.

7. A method for forming administration order program modules in a network management central that is connected to an operating control and which is connectable to communication systems for a remote control administration via a communication network, comprising the steps of:

storing an operator task list, including allocated prepared administration program modules and representing different operator tasks, in the network management central;

selecting an operator task under control of a user interface, said operator task being selected from the operator task list visualized at the operating control using an interrogation routine implemented in the operating control, and interrogating operator-prescribable administration and maintenance parameters and job-associated information for the communication systems to be administered under control of the user interface and entering said parameters and said job-associated information into a respective prepared administration program module for forming an administration order program module;

said job-associated information consisting of at least communication system information identifying the communication system to be administered, job information defining the respective operator task, and type of job information determining the type of the administration order, and being stored in a job library file; storing the allocated administration order program module in a job file memory of the network management central;

due to the job library file entry of a job management routine, informing the allocated administration order program module that the administration order program modules are transmitted using the job management routine to the communication systems identified by the communication system information, that the administration and maintenance instructions of the administration order program modules are supplied to the administration program modules in the appertaining communication systems that interpret and process the administration and maintenance instructions;

communicating results of the processing are communicated via the communication network to the network management central and storing the communicating results in the network management central;

selecting the type of job information from the group of type of job information consisting of:

time information defining a next possible point in time of transmission of a respective administration order program module;

transmission time information defining a point in time of transmission of a respective administration order program module;

job display information visualizing current job information of a selected or of a plurality of administration order program modules at a display means of the operating control;

erase information that erases a job;

editing information that enables an editing of an administration order program module at the user interface; or job status information that visualizes a current processing status of an administration order program module at the user interface;

the following being effected in the interrogation routine:

the user interface is controlled by a keyboard program module;

prescribed stored texts are forwarded to a display means at the user interface by a text program module;

help information that informs and prompts the user is forwarded to the display means by a help program module;

administration order program module can be edited by an editing program module;

the job-associated information is managed by a data management program module;

a list of available operative tasks is managed by an operated task program module;

generation of administration order program modules is effected by a generation program module; and entry and reading of the job-associated information in the job library file is effected by a job library program module.

8. The method according to claim 7, wherein the operator tasks, the job-associated information about the communication systems to be administered, and the administration and maintenance parameters to be inserted into the administration order program modules are each respectively selected by user interface controlled inputs using the interrogation routine and using interrogation masks controlled at the user interface of the operating control, the operating masks being fashioned in view of operator prompting such that a minimal user interface controlled input is effected.

9. The method according to claim 7, wherein status information that indicates processing status of the administration order program module is entered in a job library file in the network management central using the job management routine.

10. The method according to claim 7, wherein type of job processing is modified by the type of job information, the job information and the communication system information recited in an updating message by entry of the current type of job information into the job library file or the entered status information of a job defined by the communication system information and job information is interrogated and visualized.

* * * * *